United States Patent [19]

Heath

[11] 4,342,572
[45] Aug. 3, 1982

[54] THERMAL CIRCULATION GAS TREATER

[76] Inventor: Rodney T. Heath, 109 W. 31st St., Farmington, N. Mex. 87501

[21] Appl. No.: 222,285

[22] Filed: Jan. 5, 1981

[51] Int. Cl.³ ............................................. B01D 19/00
[52] U.S. Cl. ....................................... 55/160; 55/174; 55/175; 55/208
[58] Field of Search ............................... 55/20, 30–32, 55/45, 49, 51, 80, 160, 174, 175, 185, 195, 198, 208

[56] References Cited

U.S. PATENT DOCUMENTS

| | | | |
|---|---|---|---|
| Re. 25,759 | 4/1965 | Walker et al. | 55/160 X |
| 2,619,187 | 11/1962 | Hayes et al. | 55/175 |
| 2,732,070 | 1/1956 | Glasgow et al. | 55/208 X |
| 2,948,352 | 8/1960 | Walker et al. | 55/175 X |
| 3,025,928 | 3/1962 | Heath | 55/160 X |
| 3,119,674 | 1/1964 | Glasgow et al. | 55/32 X |
| 3,206,916 | 9/1965 | Glasgow et al. | 55/32 X |
| 3,318,071 | 5/1967 | Sinex | 55/174 X |
| 3,397,731 | 8/1968 | Gravis et al. | 55/32 X |
| 3,541,763 | 11/1970 | Heath | 55/185 |
| 4,010,065 | 3/1977 | Alleman | 55/32 X |
| 4,198,214 | 4/1980 | Heath | 55/175 X |

Primary Examiner—Robert H. Spitzer
Attorney, Agent, or Firm—Bruce G. Klaas; Jerry W. Berkstresser

[57] ABSTRACT

A well effluent stream passes into a high pressure separator tank where liquids separate from gas. A very small amount of gas from the well effluent is fed through a thermostat to a glycol seal pot to control a closed glycol heating system for the high pressure separator. The closed glycol system receives its thermal energy from heat exchange from a separate process glycol system.

13 Claims, 2 Drawing Figures

THERMAL CIRCULATION GAS TREATER

This invention relates to a self circulating glycol heating system for an oil-gas separator.

BACKGROUND OF THE INVENTION

The effluent from a petroleum or gas well may contain oil and gas, with some of the oil and/or water emulsified with the gas, and under certain conditions as the water forms hydrates. A common way to treat the connate well fluids has been to heat them to a predetermined temperature, to aid in breaking the emulsions and hydrates for the separation of gas from the oil or liquidified hydrocarbons at the separation temperature. The heating of the well streams is usually performed at or near the well head by equipment that must be automatic, as the well heads may only be rarely visited by the producer's workers. Some problems occur with the heating of well streams, as a constant temperature is high desirable, and overheating or under heating are detrimental to the treatment process. Glycol is a common dehydrating agent, and several types of equipment are commercially available, but most use a pump to circulate the glycol. For example, my U.S. Pat. No. 3,025,928 describes a highly successful oil and gas separator using a high pressure separator for oil and gas and a glycol dehydrating agent. A similar oil-gas treater with a gas dehydrator is disclosed in my U.S. Pat. No. 3,541,763 of Nov. 24, 1970. This unit provides an additional glycol dehydrating unit to the high-low pressure separators.

Hayes et al U.S. Pat. No. 2,619,187 of Nov. 25, 1952 shows a gas liquid separator using heated water to heat a well stream for the separation of the gas from the oil. The well stream is initially heated and discharged into a gas separator compartment where the separated liquids flow into a lower oil-water separator.

Glasgow et al U.S. Pat. No. 2,732,070 uses a vertical vessel with a lower vertically mounted heater unit over a boiler unit. Glycol is heated in the boiler and is transferred by a thermo-syphon to the upper heater unit. Both units are hot and transfer heat to the treater vertical vessel.

Walker et al, U.S. Pat. No. 2,948,352 is similar to Glasgow et al, above, but uses an emulsion breaker/mist extractor above the heater units. The thermo-syphon is used to transfer hot fluids from a lower boiler to an upper heater in a singly vessel unit.

THE PRESENT INVENTION

The present invention provides a glycol heating system for an oil-gas separator, normally mounted at a well head. The unit provides a hot column of heating glycol and cool column of heating glycol, whereby the hot column being less dense then causes the heating glycol to flow throughout the system. The system essentially includes a heating glycol-process glycol heat exchanger, wherein the heating glycol after being heated by the process glycol passes to a dome and down a standpipe to a seal pot, which provides a controlled feed of the hot glycol to a heating coil in the high pressure separator. The seal pot is controlled by a thermostatic control valve in the high pressure separator providing a very small amount of control gas to the seal pot.

OBJECTS AND ADVANTAGES OF THE PRESENT INVENTION

Included among the objects and advantages of the invention is to provide a glycol heating system for a glycol dehydrator and gas-oil separation unit.

Another object of the invention is to provide a glycol circulation system without pumps for a gas-oil separator.

Yet another object of the invention is to provide a closed system of a heating fluid in a glycol system of an oil-gas separator.

Still another object of the invention is to provide a thermal driven glycol heating system separated from a glycol dehydrator of a gas-oil separator.

An additional object of the invention is to provide an insulated pot seal for the control of the flow of glycol heating fluid in a gas-oil separator.

A further object of the invention is to provide a gas pressure controlled seal pot for a glycol heating system, controlling the rate of flow of the circulating heating glycol with minor quantity of gas from the stream being separated.

A still further object of the invention is to provide a gas pressure controlled seal pot in a heating fluid circuit to control the quantity of heat supplied to a gas-oil separator by controlling the quantity heating fluid to a heat exchange coil in the separator.

These and other object and advantages of the invention may be ascertained by the following description and appended drawings.

GENERAL DESCRIPTION OF THE DRAWINGS

SPECIFIC DESCRIPTION OF THE ILLUSTRATIONS

Figure 1:
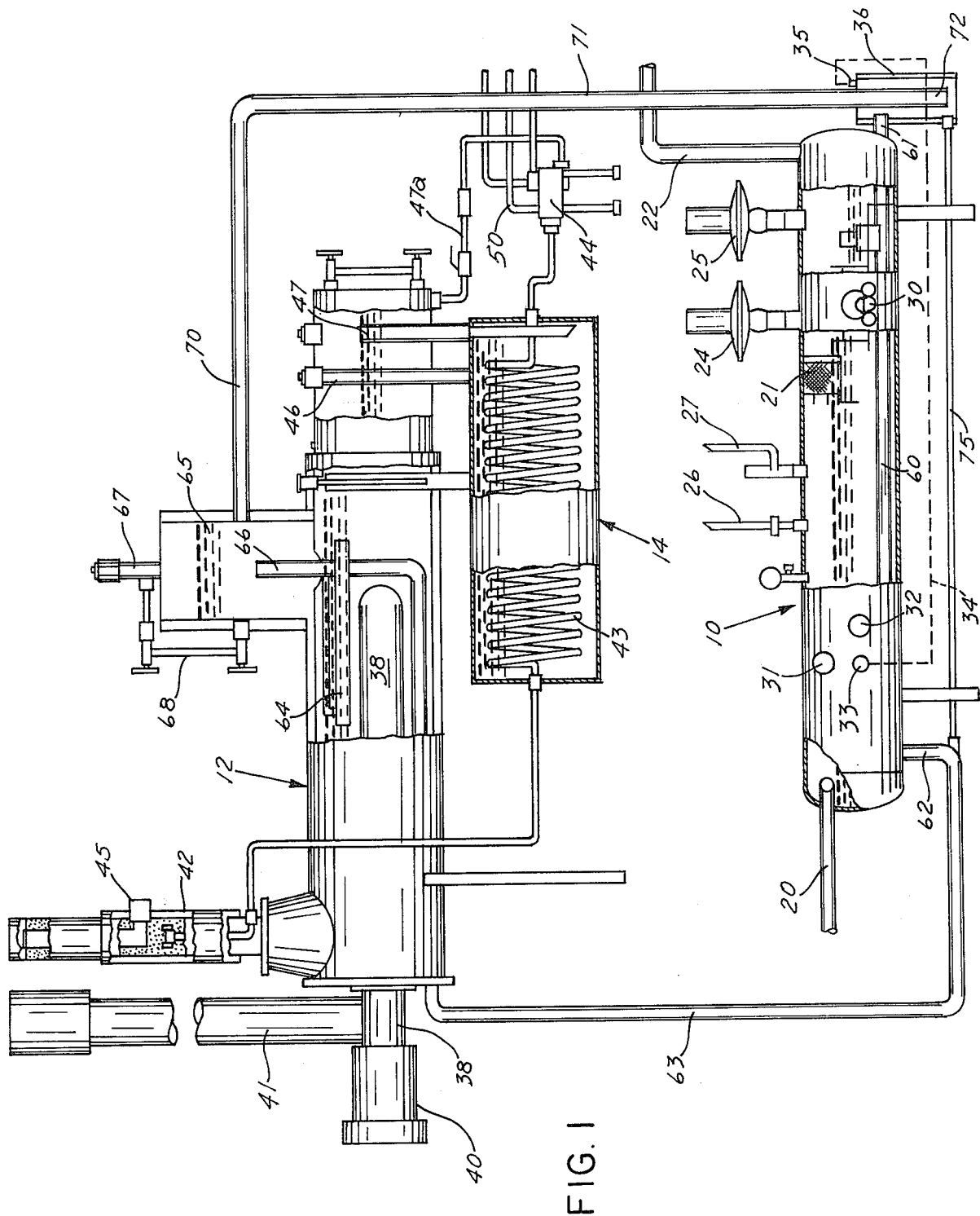
FIG. 1 is a partially broken away side elevational view of a high pressure separator, reboiler and heat exchanger portion of a gaseous well effluent treater, schematically illustrating the glycol heating circuit of the invention.
Figure 2:
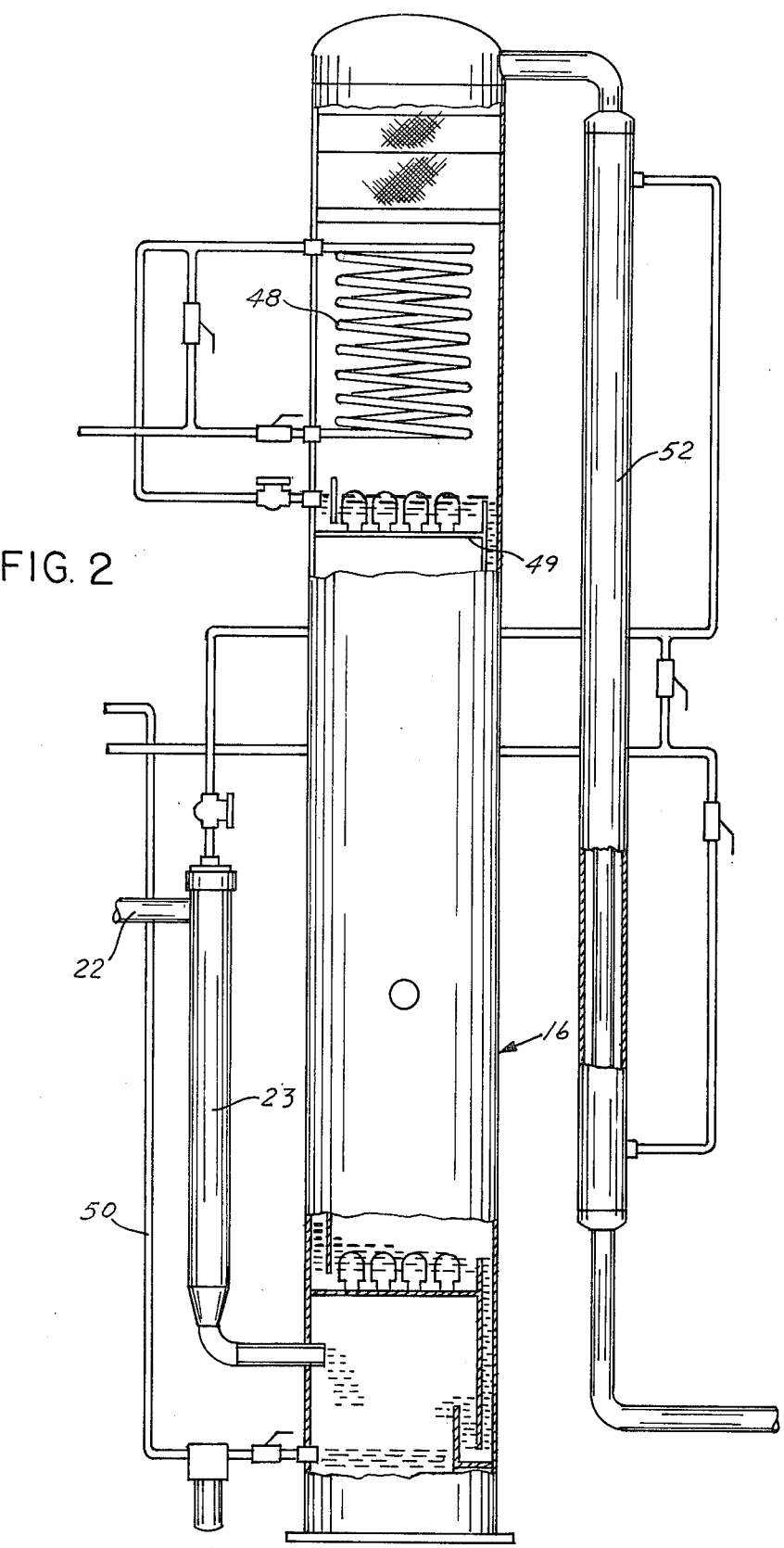
FIG. 2 is a partially broken away dehydrator unit of a gaseous well effluent treater, illustrating the connection of dehydrator to the separator system of FIG. 1.

The well effluent treater system illustrated includes in FIG. 1 a three phase, high pressure separator illustrated by general number 10, a reboiler shown generally by number 12 and a process heat exchanger shown generally by number 14. In FIG. 2 an absorber or dehydrator 16 is illustrated with the connections to the units of FIG. 1. These units are the major portions of the unit. The unit contains two separate glycol systems. A glycol heating system is used to provide heat to the high pressure separator 10 and the glycol in this system will be referred to as "heating" glycol. A glycol dehydrator system is used to remove moisture from the well gas and glycol in this system will be referred to as process glycol.

The separator 10 includes a well effluent inlet 20 introducing the effluent into the tank where liquid is separated from gas. Gas passes through a demiser 21 and subsequently through outlet 22 into a glycol contactor 23 which exhausts into the dehydrator 16 (FIG. 2). Liquid oil separated from the well effluent, oil and gas, is released from the tank by liquid dump valves 24 and 25, as are commonly used in the industry. A rupture head 26 and relief valve 27 provide essentially standard safety measures for the tank. A liquid level control assembly 30 provides controls for the dump valves. Thermometers 31 and 32 provide means for visually determining the temperature in the tank. A thermostatic control valve 33 provides a small flow of gas through a line 34 to a gas injector 35 into a seal pot 36 (detailed below).

The reboiler 12 includes a tank with a fire tube 38, fired by a burner 40 having a stack 41. A packed still column 42 is mounted on the reboiler for separation of water vapor from refluxing process glycol. The heat exchanger 14 includes a coil 43 connected to a process glycol pump 44 which is connected to the dehydrator 16, pulling rich glycol through the coil to the column 42. A water vapor outlet 45 releases water from the column while the lean process glycol flows into the reboiler 12. Hot process glycol circulates through connecting lines 46 and 47 from the reboiler 12 to the heat exchanger 14. Hot process glycol is pumped from the reboiler 12 through the pump 44 from line 47 to process glycol/gas heat exchanger coil 48 and the bubble cap plates 49 in the dehydrator 16. Process glycol in the dehydrator 16 sump is pumped by line 50 to the glycol pump 44 through the heat exchanger 14 to the column 42. An external heat exchanger 52 provides recycling process glycol to the plates of the dehydrator 16.

Such a unit is essentially standard for separating the three phases of a well effluent, and the dehydration of effluent gas by a liquid dehydrating agent.

The high pressure separator is heated by a heating glycol, closed circulating system. The system includes a heater coil 60 passing through the lower portion of the tank 10. The coil has an inlet 61 communicating with the seal pot 36 and outlet 62. A glycol return line 63 is passed into the reboiler 12 to heating glycol/process glycol heating coil 64. This coil exhausts into a heating glycol dome 65 by a standpipe 66 communicating with the dome. The dome has a charging port 67 (normally closed and sight glass level indicator 68). An outlet 70 on the dome communicates with standpipe 71 which terminates in an open end 72 in the closed seal pot 36. The seal pot 36 has a by-pass line 75, of substantially smaller cross-section than the coil 60 which communicates with the outlet 62.

In the operation of the system, gas from the well enters the separator 10 through inlet 20. The gas is separated from the liquids by gravity. The liquids are further separated, if necessary, into their respective phases (oil and water) by a conventional weir into the oil box and the water box. The liquids are removed and are passed to a tank or pit. The gas flows through the mist extractor 21 into the gas/process glycol contactor 23. The glycol introduced into the contactor 23 is a lean process glycol and is about 99% water free. The dehydrator 16 passes gas and glycol counter-currently through the dehydrator trays 49. The gas, after being dried passes through mist extractors and then through the exchanger 52. In the external heat exchanger 52 hot, lean process glycol is cooled prior to entering the dehydrator column 16.

A glycol is the medium of mass transfer for a glycol dehydrator. Most often, triethylene glycol (TEG) is used. After contact with the gas is made, the glycol is pumped out of the bottom of the dehydrator, 16 through a filter and back to the pump 44 through line 50. The rich (water laden) process glycol is then discharged from the pump to the process glycol heating coil, 43 in the process glycol/process glycol heat exchanger 14. The righ process glycol is heated in the heat exchanger prior to entering the pall ring packed still column 42. Refluxing action in the still column 42 results in a separation of the glycol/water solution. The water leaves the unit by way of the water outlet 45, in the form of steam. The reconcentrated process glycol is returned to the reboiler section 12. The energy to reconcentrate the glycol is supplied to the burner 40 and the firetube 38, located in the reboiler 12 section. The energy is usually supplied by the combustion of natural gas in the firetube 38. The natural gas is usually obtained from downstream of the dehydration unit 16. The reboiler 12 section is maintained at a temperature of about 375° F. by thermostats (not shown). The process described above is the typical glycol dehydration process.

The heating system of the invention is a closed system for circulating heating glycol through the reboiler 12 to the high pressure separator 10 coil 60. The heating glycol in coil 64 is heated to about 315° F. The coil 64 is mounted above the firetube 38 in the reboiler 12. The hot glycol flows into the dome 64 (which is an insulated dome) and then down the line 70/71 to the insulated seal pot 36. From the seal pot 36, the heating glycol flows through the coil 60 in the high pressure separator 10, where the well liquids are heated. The cooled heating glycol (about 150° F.) flows through the outlet 62, through line 63 to the coil 64 in the reboiler 12, where it is heated again to about 315° F.

The temperature in the separator 10 is controlled by the thermostatic valve 33 (a commonly used type found on remote, self-contained oil field equipment). This thermostat operates by outputting a small quantity of gas as a signal. The gas is supplied by a low pressure regulator (not shown) in conjunction with other pneumatically operated process control devices normally installed on the separator 10. When the temperature in the separator 10 is below the desired operating temperature, gas pressure is reduced to allow the liquid level in the seal pot 36 to rise and fill the glycol coil 60 whereby and maximum heat exchange between the heating glycol and the well stream liquids is achieved. When the temperature in the separator 10 is at the desired temperature, the thermostat outputs about 22 ounces of pressure, to the seal pot 36 where the gas pressure depresses the liquid height in seal pot 36 reducing the glycol flow to coil 60 in the separator 10. The small amount of low pressure gas used to modulate the seal pot 36 fluid level is injected into the seal pot 36 by the injector 35. As the level of heating glycol in the seal pot 36 is depressed, only a sufficient quantity of heating glycol flows through the coil 60 to maintain the desired temperature in the separator 10. When the temperature of liquids exceeds the desired temperature and the separator 10 does not require any additional heat, sufficient gas is injected into the seal pot 36 to depress the heating glycol level below the inlet 61 and no heating glycol flows through the coil 60. The by-pass 75 maintains a small flow of heating glycol, so that heated glycol is immediately available for the coil 60, when required. When the coil 60 requires heat again, the gas in the seal pot 36 is vented back through the thermostat 33.

The quantity of control gas necessary for operation of the seal pot 36 is minimal, maintaining a very efficient system. Since no pump is necessary normal pump malfunction and maintenance is negated. Exact temperature control of the separator liquids is attained with minimum of fluctuation. The heating glycol system is closed and it does not come into contact with oil, therefore, it is not subject to paraffin plugging of the system. In the event of well shut down, the heating glycol system is easily shut down without heat loss to the separator.

What is claimed is:

1. In a well effluent separator system having a high pressure separator and a separate low pressure fluid dehydrator system with a reboiler for the fluid dehydrator, the improvement of a closed glycol heating system for the high pressure separator comprising:

(a) closed heat exchange coil means in the reboiler for heating the glycol of said closed heating system;

(b) a hot glycol supply means for receiving hot glycol from said coil means;

(c) standpipe means for delivering hot glycol from said hot glycol supply means;

(d) seal pot means defining a closed chamber and enclosing a lower end of said standpipe means for holding a variable quantity of hot glycol in a lower end portion thereof and a variable quantity of gas in an upper end portion thereof and having an upper surface level variably located above an inlet opening at the lower end of said standpipe means;

(e) heat exchange means in the high pressure separator receiving hot glycol from said seal pot means and for transferring heat from the hot glycol to the contents of the separator and being in continuous communication with a mid-portion of said seal pot means through a seal pot outlet opening located so as to be below the upper surface level of the hot glycol in a first mode of operation and above the upper surface level of the hot glycol in a second mode of standby operation;

(f) return line means for connecting said heat exchanger means to said coil means;

(g) variable pressure gas line means terminating in said seal pot means for controlling the glycol level therein for controlling the quantity of glycol transmitted to heat exchange means in the high pressure separator; and (h) bypass line means for continuously connecting said seal pot means to said return line means whereby there is a constant continuous flow of hot glycol therebetween.

2. The assembly of claim 1, wherein said improvement includes hot glycol supply means having an enlarged volume and mounted above said heat exchange coil means.

3. The assembly of claim 1 wherein said variable pressure gas line means is fed well effluent gas and controlled by a thermostat control valve in said high pressure separator.

4. The assembly of claim 3, wherein the thermostat control valve supplies well effluent gas not substantially in excess of 22 ounces per square foot to said seal pot.

5. The assembly of claim 1, wherein the communication between said seal pot and said heat exchange means in the high pressure separator is a line terminating near the top of said seal pot.

6. The assembly of claim 5, where said by-pass line communicates with said seal pot adjacent the bottom thereof.

7. The assembly of claim 1, wherein said heat exchange coil includes a double pass coil.

8. The assembly of claim 1, wherein said glycol supply means has sufficient capacity to maintain said standpipe full of hot glycol.

9. The assembly of claim 1, wherein said heat exchange coil means is arranged to operate at about 315° F. and the return line means at about 150° F.

10. A fluid heating system for heating a gas-liquid type mixture in a gas-liquid separator unit of a natural gas dehydrator apparatus having a closed loop glycol-gas contacting system containing gas treatment glycol and including a reboiler unit for heating water rich laden gas treatment glycol after contact with the natural gas to remove the water and provide hot lean gas treatment glycol for recirculation in the closed loop glycol-gas contacting system, the fluid heating system comprising:

a first heat exchanger means mounted in the gas-liquid separator unit for receiving hot separator-fluid heating glycol and transmitting heat from the hot separator-fluid heating glycol to the gas-liquid type mixture by conduction through the first heat exchanger means;

a second heat exchanger means mounted in the reboiler unit for receiving cool separator-fluid heating glycol from said first heat exchanger means and reheating the separator-fluid heating glycol by heat transfer from the hot lean gas treatment glycol in the reboiler unit by conduction through said second heat exchanger means to provide hot separator-fluid heating glycol for recirculation through said first heat exchanger means;

a storage means having a storage inlet opening connected to said second heat exchanger means for receiving hot separator-fluid heating glycol from said second heat exchanger means and storing a predetermined minimum volume of hot separator-fluid heating glycol therewithin prior to transfer to said first heat exchanger means, and having a storage outlet opening connected to said first heat exchanger means for enabling flow of hot separator-fluid heating glycol thereto;

a seal pot means having a seal pot inlet opening connected to said storage outlet opening of said storage means for receiving hot separator-fluid heating glycol therefrom, and having a hot separator-fluid heating glycol holding chamber in the bottom portion thereof for holding variable amounts of separator-fluid heating glycol with variable upper surface levels of hot separator-fluid heating glycol therein, and having a gas holding chamber in the upper portion for holding variable quantities of gas;

a storage to seal pot passage means for enabling continuous flow of hot separator-fluid heating glycol from said storage means to said seal pot means and for providing a seal pot inlet opening within said seal pot means adjacent the bottom thereof adapted to be continuously located below the variable upper surface levels of the hot separator-fluid heating glycol held in said seal pot means;

a seal pot to first exchanger passage means for enabling flow of hot separator-fluid heating glycol from said seal pot means to said first heat exchanger means and for providing a seal pot outlet opening located above said seal pot inlet opening a distance such as to provide a first full continuous flow operating condition and a second variable continuous flow operating condition, and a third non-flow operating condition for hot separator-fluid heating glycol which are dependent solely on the level of hot separator-fluid heating glycol in said seal pot means;

a first heat exchanger to second heat exchanger passage means for enabling continuous flow of cool glycol from first said separator heat exchanger means to said second heat exchanger means providing a separator outlet opening located above a reboiler inlet opening;

bypass passage means for enabling continuous flow of hot separator-fluid heating glycol directly from said seal pot means to said first heat exchanger to second heat exchanger passage means under all conditions of operation of said seal pot means;

gas passage means having a gas inlet opening connected to the upper portion of said seal pot means for supplying gas at variable pressures thereto above the upper level of hot glycol in the lower portion thereof for holding variable quantities of gas under pressure to control the upper level of the hot separator-fluid heating glycol and establish the first, second and third operating conditions solely in accordance with the pressure and volume of gas in the chamber;

gas-operated control means for sensing the temperature of the fluids in said gas-liquid separator means and being operably connected to said gas passage means for controlling the flow of gas to said seal pot means and automatically establishing said first condition of operation whenever the temperature of the fluids in the separator is below a predetermined minimum temperature and automatically establishing said second and third operating conditions whenever the temperature of the fluids in the separator is above said predetermined minimum temperature;

said fluid heating system providing a closed loop separator-fluid heating glycol system having a flow path which is completely separate from the path of the closed loop glycol-gas contacting system, and being constructed and arranged to provide for continuous uninterrupted flow of separator-fluid heating glycol therewithin caused solely by thermosiphon effect due to the temperature differences between the hot separator-fluid heating glycol downstream and the cool separator-fluid heating glycol upstream of said second heat exchanger means.

11. The fluid heating system of claim 10 wherein the temperature of the separator-fluid heating glycol varies from a minimum temperature of approximately 150° F. in said first heat exchanger to second heat exchanger passage means to a maximum temperature of approximately 315° F. in said second heat exchanger means.

12. The fluid heating system of claim 10 wherein said storage means and said seal pot means comprise insulation for preventing heat loss from the separator-fluid heating glycol contained therein.

13. The fluid heating system of claim 10 wherein the cross sectional area of said bypass passage means is considerably smaller than the cross sectional area of said seal pot to first exchanger passage means.

* * * * *